US012212108B2

(12) United States Patent
Girolstein

(10) Patent No.: US 12,212,108 B2
(45) Date of Patent: Jan. 28, 2025

(54) ATTACHMENT AND METHOD FOR CLEANING A SOCKET

(71) Applicant: GIROLSTEIN GMBH, Rheinbrohl (DE)

(72) Inventor: Rolf Girolstein, Rheinbrohl (DE)

(73) Assignee: GIROLSTEIN GMBH, Rheinbrohl (DE)

( * ) Notice: Subject to any disclaimer, the term of this patent is extended or adjusted under 35 U.S.C. 154(b) by 71 days.

(21) Appl. No.: 17/749,196

(22) Filed: May 20, 2022

(65) Prior Publication Data

US 2023/0378704 A1 Nov. 23, 2023

(51) Int. Cl.

| | |
|---|---|
| ***H01R 43/00*** | (2006.01) |
| ***A46B 9/02*** | (2006.01) |
| ***A46B 13/02*** | (2006.01) |
| ***A46B 15/00*** | (2006.01) |
| ***A46D 1/00*** | (2006.01) |
| ***A47L 9/04*** | (2006.01) |
| ***A47L 9/06*** | (2006.01) |

(52) U.S. Cl.

CPC ............. *H01R 43/002* (2013.01); *A46B 9/02* (2013.01); *A46B 13/02* (2013.01); *A46B 15/002* (2013.01); *A46D 1/0207* (2013.01); *A47L 9/0411* (2013.01); *A47L 9/0416* (2013.01); *A47L 9/0455* (2013.01); *A47L 9/0466* (2013.01); *A47L 9/0693* (2013.01); *A46B 2200/3073* (2013.01)

(58) Field of Classification Search

None

See application file for complete search history.

(56) References Cited

FOREIGN PATENT DOCUMENTS

| | | | | |
|---|---|---|---|---|
| DE | 102013207985 A1 * | 11/2014 | ............... | A46B 7/04 |
| DE | 102019133219 A1 * | 6/2021 | ............. | A46B 13/02 |
| EP | 3496214 A1 * | 6/2019 | ........... | H01R 43/002 |

OTHER PUBLICATIONS

English Machine Translation of DE-102019133219-A1.*
English Machine Translation of DE102013207985 (Year: 2014).*

* cited by examiner

*Primary Examiner* — Natasha N Campbell
*Assistant Examiner* — Pradhuman Parihar
(74) *Attorney, Agent, or Firm* — Schmeiser, Olsen & Watts LLP

(57) ABSTRACT

An attachment for cleaning a socket is provided including a body with an insertion section of the body for insertion into the socket along an insertion direction and with a connection section of the body for connection to a suction inlet of a vacuum cleaner, the attachment including at least one cleaning element for mechanical cleaning of an inner surface of the socket. The attachment includes at least one bearing element attached to the body, wherein the cleaning element is rotatably mounted on the bearing element relative to the body about an axis of rotation aligned along the insertion direction, and at least one drive element attached to the body for automatically rotating the at least one cleaning element about the axis of rotation. A method for cleaning a socket with the attachment is also provided.

14 Claims, 2 Drawing Sheets

ATTACHMENT AND METHOD FOR CLEANING A SOCKET

FIELD OF TECHNOLOGY

The following relates to an attachment for cleaning a socket having a body comprising an insertion portion of the body for insertion into the socket along an insertion direction and a connection portion of the body for connection to a suction inlet of a vacuum cleaner, the attachment having at least one cleaning element for mechanically cleaning an inner surface of the socket.

The following further relates to a method for cleaning a socket with an attachment according to embodiments of the invention.

BACKGROUND

It is known from the conventional art to clean a socket manually with a paintbrush or with a specially shaped brush. However, thorough cleaning in this way is only possible with a great deal of time. There is also the problem that dirt loosened from the socket falls onto the floor, where it must be removed in an additional work step.

Patent application DE102013207985A1 shows a device for cleaning a socket, comprising a body which is at least partially insertable into a socket. Thereby, the body has cleaning elements for cleaning the socket, a plurality of air suction openings and an insertion nozzle for connection to a vacuum cleaner. Thus, by manually moving the body in the socket, dirt can be loosened with the help of the cleaning elements and sucked into the vacuum cleaner through the device. However, if the socket is very dirty, it is difficult to completely loosen the dirt from the socket by moving the body.

SUMMARY

An aspect relates to a low-cost device and method for conveniently, easily, quickly, and thoroughly cleaning a socket.

Embodiments of the invention provide an attachment, which solves the technical problem. Likewise, the problem is solved by a method. Advantageous embodiments are described below.

DESCRIPTION OF THE EMBODIMENTS

Embodiments of the invention relate to an attachment for cleaning a socket having a body. The body comprises an insertion portion for insertion into the socket along an insertion direction, and a connection portion for connection to a suction inlet of a vacuum cleaner. The attachment includes at least one cleaning element for mechanically cleaning an inner surface of the socket. The inner surface may comprise, for example, a bottom surface and/or a side surface of the socket.

A socket in the sense of embodiments of the invention serves as an electrical connector between lines. It is either permanently installed on a wall (surface-mounted) or recessed (flush-mounted), or part of a mobile line coupling, such as desktop sockets or multiple sockets or extensions intended for mobile use. The socket is designed for power supply. However, telephone and data transmission sockets are also sockets in the sense of embodiments of the invention.

The socket is a household socket, in particular a socket of one of the types A to N according to the classification of the International Electrotechnical Commission (IEC).

The attachment comprises at least one bearing element attached to the body, wherein the cleaning element is rotatably mounted on the bearing element relative to the body about an axis of rotation aligned along the insertion direction. The attachment comprises at least one drive element attached to the body for automatic rotation of the cleaning element about the axis of rotation.

The bearing element, which can comprise for example at least one ball bearing, roller bearing and/or plain bearing, with a self-lubricating plastic, and the drive element, the cleaning element, which can comprise for example a brush, can be automatically rotated relative to the body about the axis of rotation. As a result, a substantially higher speed of the cleaning element relative to the inner surface of the socket can be achieved than in the case of a manual movement of the entire body with cleaning elements attached thereto according to DE102013207985A1. The higher speed results in faster and more thorough removal of dirt from the inner surface. Furthermore, the automatic movement makes the operation easier and more comfortable than with a manual movement.

The inlet section comprises at least one air inlet for inlet of air and dirt into the body. The connection section comprises at least one air outlet for discharging air and dirt from the body into the suction inlet of the vacuum cleaner. The body comprises at least one duct fluidly connecting the air inlet to the air outlet. The air inlet, the duct, and the air outlet allow debris dislodged from the interior surface of the socket to be drawn into the vacuum cleaner so that a surrounding area of the socket is not contaminated.

The body comprises or consists of at least one tube. The tube comprises or forms the at least one duct. Due to these embodiments, the attachment is particularly simple in construction and particularly inexpensive to manufacture.

The tube contains the at least one cleaning element, the at least one drive element and/or the at least one bearing element at least in sections, completely. Thus, the tube protects the elements from mechanical damage. Furthermore, a user is prevented from touching a cleaning element that is possibly in electrically conductive contact with a contact surface of the socket that is under electrical voltage or that is electrostatically charged.

The connection section is designed to be plugged into or onto the suction inlet of the vacuum cleaner and comprises at least one sealing means for the airtight connection of the air outlet to the suction inlet. In particular, the connection section can be designed as in known suction attachments for vacuum cleaners.

In embodiments, the attachment comprises exactly one cleaning element, wherein the axis of rotation of the cleaning element is arranged to be coaxial with a central perpendicular axis of a bottom surface of the socket. As a result, when the attachment is inserted into the socket, the cleaning element rotates about the central perpendicular axis. As a result, a socket having a substantially round bottom surface, for example a type C, E, F, H or K household socket according to the classification of the International Electrotechnical Commission (IEC), can be completely and thoroughly cleaned with exactly one cleaning element. Complete and thorough cleaning is thus achieved with a particularly simple attachment design.

In embodiments, the attachment comprises a plurality of, two, cleaning elements corresponding to a plurality of contact openings of the socket, wherein the axis of rotation of each of the cleaning elements is arranged for coaxial arrangement to a central perpendicular axis of one of the contact openings. As a result, when the attachment is inserted into the socket, the cleaning elements rotate about the central perpendicular axes of the contact openings. This prevents the cleaning elements from pushing loosened dirt into the contact openings, which could disrupt the function of the socket.

The at least one drive element is designed for counter-rotation of mutually adjacent cleaning elements. By rotating in opposite directions, the mutually adjacent cleaning elements do not impede each other if they touch each other.

If the attachment comprises a plurality of cleaning elements, each cleaning element is associated with a respective drive element for its rotation.

The cleaning element comprises a plurality of cleaning bristles arranged around the axis of rotation. A quick and thorough cleaning of the socket is achieved by a plurality of cleaning bristles, which can be attached, for example, to a ring mounted on the bearing element.

The cleaning bristles are oriented at an angle of inclination of 5° to 85°, 30° to 60°, or 40° to 50°, to the direction of insertion. Due to the inclined orientation of the cleaning bristles, dirt can be removed particularly efficiently from the inner surface of the socket.

The cleaning bristles comprise a number of inner bristles and a number of outer bristles, the inner bristles differing from the outer bristles in their length, their bending stiffness and/or their angle of inclination. In particular, the outer bristles may have a greater length, a lower bending stiffness and/or a greater angle of inclination than the inner bristles. As a result, both an inner region of the inner surface of the socket that is close to the axis of rotation and an outer region of the inner surface that is further away from the axis of rotation than the inner region can be cleaned thoroughly and quickly without incurring high friction losses. High friction losses could occur, for example, if uniformly long cleaning bristles had to be strongly deformed in the inner area to thoroughly clean the outer area as well.

The attachment comprises at least one spacer attached to the body for spacing the at least one bearing element from a bottom surface of the socket. The spacer ensures that the at least one cleaning element can rotate with low friction between the at least one bearing element and the bottom surface, when the attachment is drawn to the socket by a pressure below atmospheric pressure generated by the vacuum cleaner.

In the simplest case, the spacer may be a section of the body. For example, the body may comprise a tube in which the bearing element is arranged. A protrusion of the tube over the bearing element in the insertion direction can in this case form the spacer.

The at least one spacer comprises at least one positioning pin for at least partial insertion, precisely fitting, into a contact opening of the socket, one positioning pin being provided for partial insertion into each of the contact openings of the socket. The at least one positioning pin has the advantage that, in addition to the distance to the base surface, it also defines a position of the attachment transverse to the insertion direction, so that the attachment can be inserted quickly and easily into the socket.

If the positioning pin fits precisely into the contact opening, it also prevents loosened dirt from entering the contact opening where it could impair the function of the socket. “Precise fit” in the sense of embodiments of the invention means that the positioning pin fits into the contact opening as precisely as a contact pin of a plug associated with the socket.

The at least one positioning pin comprises at least one internal cleaning element for internal cleaning of the contact opening. The at least one internal cleaning element may, for example, comprise a number of cleaning bristles and/or cleaning lamellae and/or a cleaning fleece on an outer surface of the positioning pin. The interior cleaning element can be used to remove dirt from the contact opening when the attachment is pulled out of the socket.

The axis of rotation of the at least one cleaning element is identical to a central longitudinal axis of the at least one positioning pin. As a result, the axis of rotation is aligned concentrically with the central perpendicular axis of the contact opening when the attachment is inserted into the socket, which leads to particularly thorough cleaning in the case of conventional household sockets.

The at least one positioning pin is rigidly connected to the body. This allows the positioning pin to position the attachment stably and reliably. In particular, the cleaning element can rotate around the positioning pin, thus avoiding frictional losses that would occur if the positioning pin rotated in the contact opening.

The at least one drive element comprises at least one propeller and/or at least one turbine for rotation of the at least one cleaning element driven by an airflow passing through the body. In this way, an air flow generated by the vacuum cleaner through the body can be used to drive the rotation, so that no separate power supply is required for the drive element.

The propeller or turbine is mounted on the at least one bearing element to be rotatable about the axis of rotation relative to the body. By mounting both the propeller or turbine and the cleaning element on the bearing element, a particularly simple design of the attachment is achieved.

The attachment comprises at least one holding element attached to the body, the at least one holding element holding the at least one bearing element and holding the at least one drive element in the body. In the simplest case, the holding element may be a portion of the body. For example, the holding element may comprise at least one web secured in the body.

The at least one holding element comprises a screen or grid covering a cross-sectional area of the body. A screen or grid allows the bearing element to be held in the body in a particularly stable manner and allows air and loosened dirt to pass through the body to the vacuum cleaner.

The at least one holding element is detachably connected to the body, for example with a screw, plug-in and/or clamp connection. This allows the holding element to be removed from the attachment, together with the bearing element, the cleaning element and/or the drive element, for example for cleaning.

In an embodiment, the insertion section is configured for precisely fitting insertion into the socket, so that it can be quickly and easily inserted into the socket. “Precisely fitting” means in the sense of embodiments of the invention that the insertion section fits into the socket just as precisely as a plug associated with the socket.

The insertion section comprises a number of side cleaning elements, a number of side cleaning bristles and/or cleaning lamellae and/or at least one cleaning felt, for mechanically cleaning a side surface of the socket that extends around the insertion direction. This allows dirt to be loosened and removed from the side surface when the attachment is inserted into the socket and/or when it is withdrawn from the socket.

In embodiments, the at least one drive element comprises at least one electric motor for rotating the at least one cleaning element, wherein the attachment comprises a supply device for supplying electric energy to the motor, wherein the supply device comprises an energy storage device for storing electric energy and/or an extraction device for extracting electric energy from the socket. The energy storage device may, for example, comprise at least a battery, an accumulator and/or a capacitor. The extraction device may be configured, for example, to extract electrical energy from the socket via positioning pins of the attachment.

An electric motor allows the attachment to be used without a vacuum cleaner for thorough, easy, and quick cleaning of a socket.

The at least one drive element may comprise at least one mechanical drive for translating translation of the body relative to the socket into rotation of the at least one cleaning element about the axis of rotation. For example, the mechanical drive may comprise at least one roller or wheel that rolls along a side surface of the socket when the attachment is inserted into the socket, thereby driving the rotation of the cleaning element, for example via a gear train.

A mechanical drive allows the attachment to be used without a vacuum cleaner for thorough, easy, and quick cleaning of a socket.

The at least one cleaning element, the at least one inner cleaning element and/or the at least one side cleaning element comprises or consists of an electrically non-conductive material, in particular a synthetic fiber, polyethylene, and/or at least one natural fiber, hair and/or hemp. A non-conductive material prevents short circuits in the socket and protects a user of the attachment from electric shocks. The materials have been found to be particularly advantageous for thoroughly cleaning the socket without scratching it.

The body comprises or consists of an electrically insulating material, a plastic. An electrically insulating material protects a user of the attachment from electric shocks.

The body comprises a discharge element for discharging electrical charge to a protective contact of the socket. In an embodiment, the discharge element connects the protective contact in an electrically conductive manner to the at least one cleaning element when the attachment is plugged into the socket, for example via at least one cable.

Friction between the at least one cleaning element and the inner surface of the socket may cause electrostatic charging of the cleaning element. The discharge element can prevent a user who touches the cleaning element after cleaning the socket from receiving an electric shock.

The attachment comprises a suction element for sucking dirt emerging from the socket radially to the direction of insertion outside the insertion section into the suction inlet of the vacuum cleaner, wherein the suction element comprises a suction bell having a base opening with a base edge for abutment against a wall surrounding the socket and a tip opening for connection to the suction inlet of the vacuum cleaner. The suction element prevents dirt possibly exiting the socket outside of the insertion section due to rotation of the at least one cleaning element from contaminating a surrounding area of the socket.

Embodiments of the invention relate to a method for cleaning a socket using an attachment. The method comprises at least an insertion of the insertion portion of the body of the attachment along the insertion direction into the socket and at least during the insertion and/or after the insertion, an automatic rotation of the at least one cleaning element about the axis of rotation by the at least one drive element for mechanically cleaning an inner surface of the socket.

The method comprises connecting the connection section of the body of the attachment to a suction inlet of a vacuum cleaner, before the rotation of the at least one cleaning element.

The method comprises sucking dirt dislodged from the inner surface of the socket through the body into the vacuum cleaner, in particular at least during rotation and/or after rotation of the at least one cleaning element.

Advantages and further embodiments of the method according to the invention follow directly from the description of the attachment according to the invention.

BRIEF DESCRIPTION

Some of the embodiments will be described in detail, with references to the following Figures, wherein like designations denote like members, wherein.

DETAILED DESCRIPTION

Figure 1:
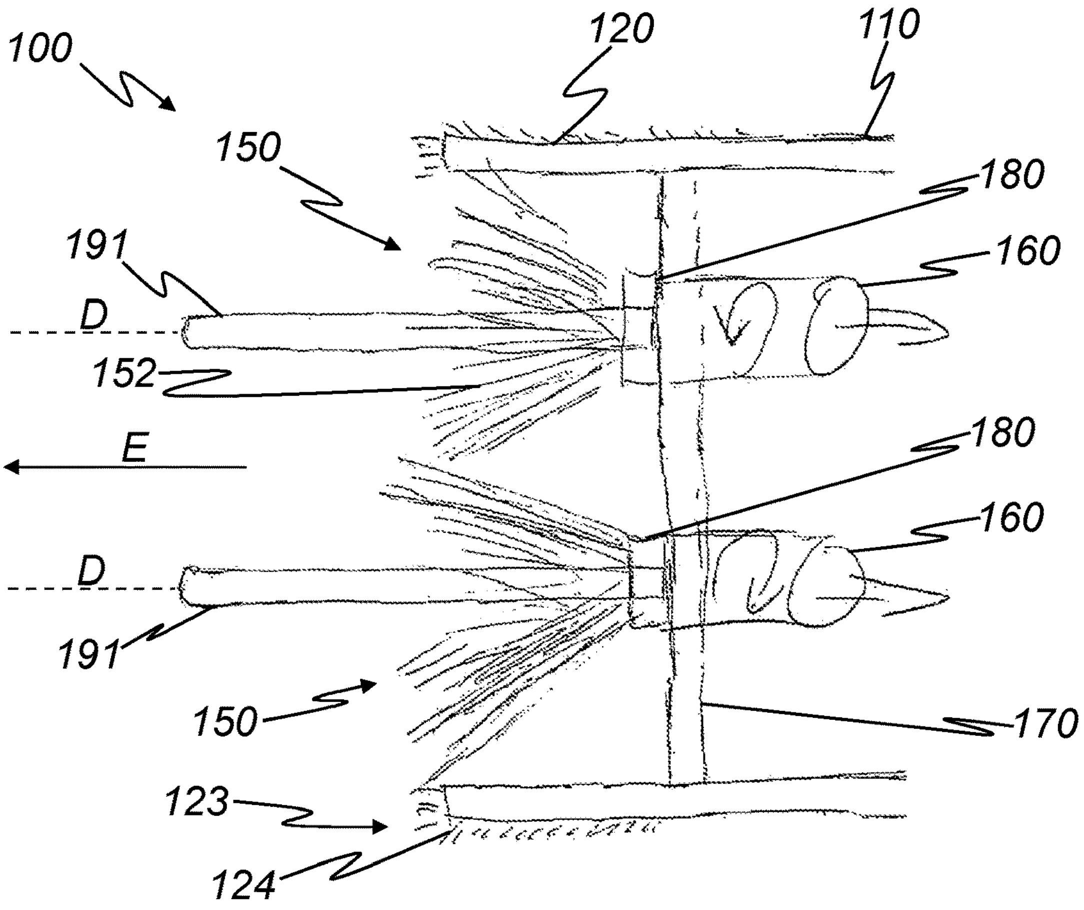
FIG. 1 shows a schematic longitudinal section of an attachment according to embodiments of the invention.

FIG. 1 shows a schematic longitudinal section of an attachment 100 according to embodiments of the invention along an insertion direction E for inserting the attachment 100 into a socket (not shown).

The attachment 100 comprises a body 110, which may be configured as a tube, for example. The body 110 comprises an insertion section 120 for insertion into the socket along the insertion direction E.

The attachment 100 includes at least one cleaning element 150, such as two cleaning elements 150, for mechanically cleaning an inner surface of the socket.

The attachment 100 comprises at least one bearing element 180 attached to the body 110, for example two bearing elements 180, which can be designed as rolling bearings. A respective cleaning element 150 is mounted on a respective bearing element 180 to be rotatable relative to the body 110 about an axis of rotation D aligned along the insertion direction E.

The attachment 100 comprises at least one drive element 160 attached to the body 110, for example one drive element 160 for each cleaning element 150, for automatically rotating the at least one cleaning element 150 about the respective axis of rotation D.

In an embodiment, the two cleaning elements 150 are driven with opposite directions of rotation (indicated by arrows).

Each cleaning element 150 comprises a plurality of cleaning bristles 152 arranged around the axis of rotation D, wherein the cleaning bristles 152 are oriented, for example, at an angle of inclination of 30° to 60° obliquely to the insertion direction E.

The attachment 100 comprises at least one, for example two, spacers configured as positioning pins 191 for spacing the bearing elements 180 from a base surface of the socket, wherein, for example, one positioning pin 191 is provided in each case for partial insertion, with a precise fit, into each of the contact openings of the socket.

The rotational axes D of the cleaning elements 150 are each identical to a central longitudinal axis of one of the positioning pins 191, wherein the positioning pins 191 are rigidly connected to the body 110, for example.

The drive elements 160 are designed as turbines for the rotation of a respective cleaning element 150 driven by an air stream flowing through the body 110 (indicated by arrows), the turbines being mounted on a respective one of the bearing elements 180 to be rotatable relative to the body 110 about the axis of rotation D of the respective cleaning element 150.

For example, the attachment 100 includes a holding element 170 attached to the body 110 to hold the at least one bearing element 180 within the body 110, wherein the holding element 170 is configured, for example, as a screen covering a cross-sectional area of the body 110.

For example, the insertion section 120 includes a number of side cleaning elements 123, such as a number of side cleaning bristles 124 for mechanically cleaning a side surface of the socket that extends around the insertion direction E.

Figure 2:
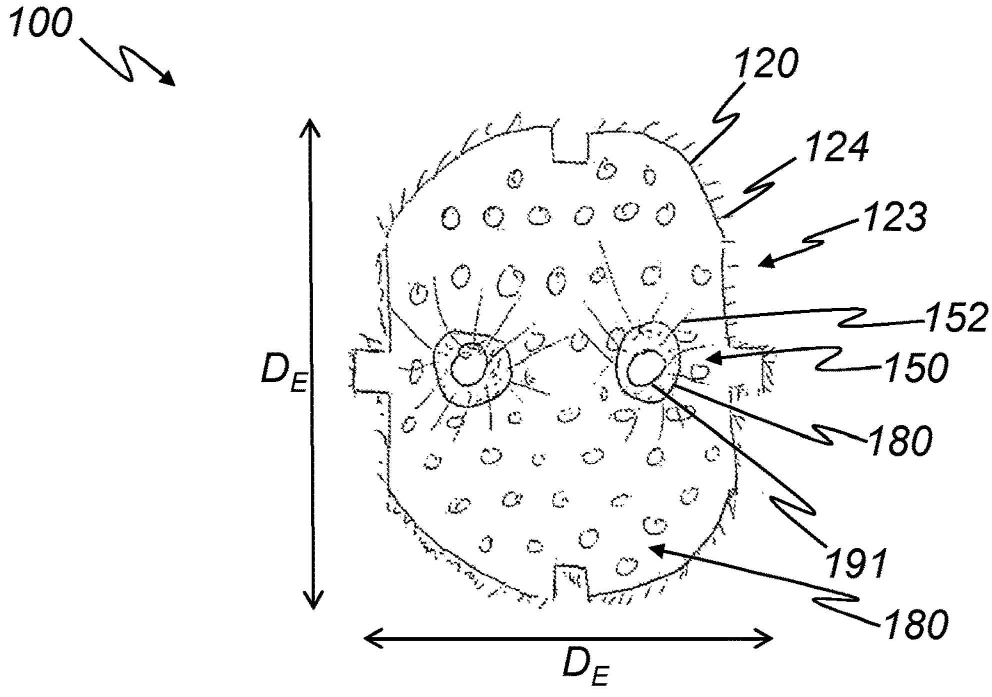
FIG. 2 shows a schematic front view of an attachment according to embodiments of the invention.

FIG. 2 shows a schematic front view of an attachment 100 according to embodiments of the invention against the insertion direction. Features with the same reference signs as in FIG. 1 can be designed as described for FIG. 1.

The insertion section 120 is designed, for example, for precise insertion into the socket and for this purpose has a cross-sectional area transverse to the insertion direction that is identical in shape and dimensions to a plug belonging to the socket. In particular, the insertion section can have the same insertion diameter $D_E$ perpendicular to the direction of insertion as the plug, which can be, for example, a Schuko plug (type F according to the classification of the International Electrotechnical Commission (IEC)). For a type C, E, F or K socket according to the International Electrotechnical Commission (IEC) classification, the insertion diameter $D_E$ is (36.5±0.5) mm.

Figure 3:
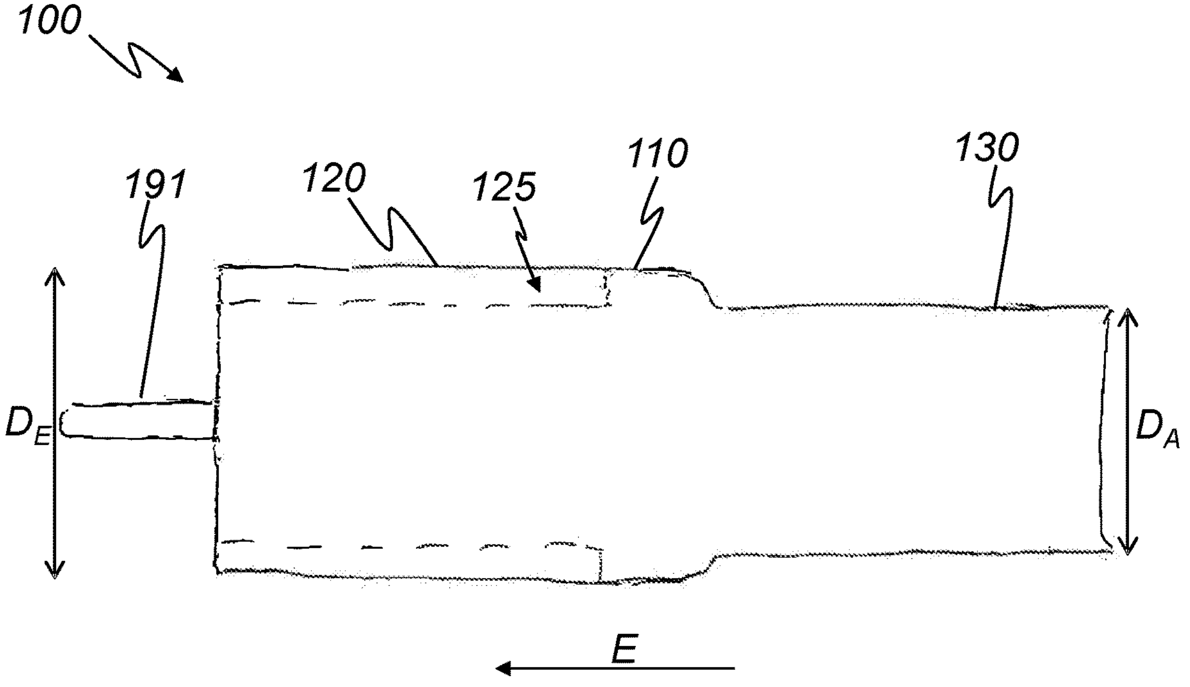
FIG. 3 shows a schematic side view of an attachment according to embodiments of the invention.

FIG. 3 shows a schematic side view of an attachment according to embodiments of the invention. 100 transverse to the insertion direction E. Features marked with the same reference signs as in FIG. 1 or 2 can be designed as described for FIG. 1 or 2.

The insertion section 120 comprises, for example, a number of, two, guide grooves 125 for guiding the attachment 100 on matching guide webs of the socket during insertion into the socket. The guide grooves 125 are configured like corresponding guide grooves of a plug belonging to the socket. Similarly, the insertion 120 may also comprise guide ridges (not shown) for guiding on matching guide grooves of the socket.

The body 110 comprises a connection section 130 for connection to a suction inlet of a vacuum cleaner. The connection section 130 is designed to be plugged into or onto the suction inlet of the vacuum cleaner and has a connection diameter $D_A$, for example 32 mm or 35 mm for commercially available vacuum cleaners, that matches the suction inlet.

Although the invention has been illustrated and described in greater detail with reference to the preferred exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

| List of reference signs | |
|---|---|
| 100 | Attachment |
| 110 | Body |
| 120 | Insertion section |
| 123 | Side cleaning element |
| 124 | Side cleaning bristle |
| 125 | Guide groove |
| 130 | Connection section |
| 150 | Cleaning element |
| 152 | Cleaning bristle |
| 160 | Drive element |
| 170 | Holding element |
| 180 | Bearing element |
| 191 | Positioning pin |
| D | Rotation axis |
| $D_E$ | Insertion diameter |
| $D_A$ | Connection diameter |
| E | Insertion direction |

The invention claimed is:

1. An attachment for cleaning a socket, the attachment having:

a) a body comprising an insertion section for insertion into the socket along an insertion direction and a connection section for connection to a suction inlet of a vacuum cleaner;

b) at least one cleaning element for mechanical cleaning of an inner surface of the socket;

c) at least one bearing element fastened to the body, the at least one cleaning element being rotatably mounted on the at least one bearing element relative to the body about an axis of rotation aligned along the insertion direction; and d) at least one drive element fastened to the body for automatic rotation of the at least one cleaning element about the axis of rotation, wherein the at least one drive element comprises at least one propeller and/or at least one turbine for rotation of the at least one cleaning element driven by an air stream flowing through the body.

2. The attachment according to claim 1, wherein the at least one cleaning element is one cleaning element, wherein the axis of rotation of the one cleaning element is arranged for coaxial arrangement to a central perpendicular axis of a bottom surface of the socket; or wherein the at least one cleaning element is a plurality of cleaning elements corresponding to a plurality of contact openings of the socket, wherein the axis of rotation of each of the plurality of cleaning elements is arranged for coaxial arrangement to a central perpendicular axis of one of the contact openings.

3. The attachment according to claim 1, wherein a) the at least one cleaning element comprises a plurality of cleaning bristles arranged around the axis of rotation; and b) wherein the cleaning bristles are oriented obliquely to the insertion direction with an angle of inclination of 5° to 85°.

4. The attachment according to claim 3, wherein a) the cleaning bristles comprise a number of inner bristles and a number of outer bristles; and b) wherein the inner bristles differ from the outer bristles in their length, their bending stiffness and/or their angle of inclination.

5. The attachment according to claim 1, comprising:

at least one spacer attached to the body for spacing the at least one bearing element from a bottom surface of the socket.

6. The attachment according to claim 5, wherein the at least one spacer comprises at least one positioning pin for at least partial insertion into a contact opening of the socket.

7. The attachment according to claim 6, wherein the axis of rotation of the at least one cleaning element is identical to a central longitudinal axis of the at least one positioning pin, wherein the at least one positioning pin is rigidly connected to the body.

8. The attachment according to claim 1, wherein the propeller or the turbine is mounted on the at least one bearing element for rotation about the axis of rotation relative to the body.

9. The attachment according to claim 1, comprising:

a) at least one holding element attached to the body;

b) wherein the at least one holding element holds the at least one bearing element and the at least one drive element in the body;

c) wherein the at least one holding element comprises a screen or grid covering a cross-sectional area of the body; and/or d) wherein the at least one holding element is detachably connected to the body.

10. The attachment according to claim 1, wherein the insertion section comprises a plurality of side cleaning elements, a plurality of side cleaning bristles, cleaning lamellae, and/or at least one cleaning felt, for mechanical cleaning of a side surface of the socket that extends around the insertion direction.

11. The attachment according to claim 1, wherein a) the at least one drive element comprises at least one electric motor for rotating the at least one cleaning element; and b) a supply device for supplying the motor with electric energy.

12. The attachment according to claim 1, wherein the at least one cleaning element comprises an electrically non-conductive material, at least one synthetic fiber, polyethylene, and/or at least one natural fiber, hair and/or hemp.

13. The attachment according to claim 1, wherein the body comprises an electrically insulating material and/or a plastic.

14. The attachment according to claim 1, comprising:

a) a suction element for sucking dirt exiting the socket radially with respect to the insertion direction outside the insertion section into the suction inlet of the vacuum cleaner; and b) wherein the suction element comprises a suction bell having a base opening with a base edge for abutment against a wall surrounding the socket and a tip opening for connection to the suction inlet of the vacuum cleaner.

* * * * *